US010685305B2

(12) United States Patent
Bianchi et al.

(10) Patent No.: US 10,685,305 B2
(45) Date of Patent: Jun. 16, 2020

(54) EVALUATING ADOPTION OF COMPUTING DEPLOYMENT SOLUTIONS

(71) Applicant: International Business Machines Corporation, Armonk, NY (US)

(72) Inventors: Silvia Cristina Sardela Bianchi, São Paulo (BR); Guilherme Steinberger Elias, Sumare (BR); Marcos Vinicius Landivar Paraiso, São Paulo (BR); Fabio Minoru Tanada, Campinas (BR); Sergio Varga, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 14/887,014

(22) Filed: Oct. 19, 2015

(65) Prior Publication Data

US 2017/0109685 A1 Apr. 20, 2017

(51) Int. Cl.
*G06Q 10/06* (2012.01)
*G06F 8/60* (2018.01)
*G06Q 10/00* (2012.01)

(52) U.S. Cl.
CPC ....... *G06Q 10/063118* (2013.01); *G06F 8/60* (2013.01)

(58) Field of Classification Search
CPC .......................... G06Q 10/063118; G06F 8/60
USPC ...................................................... 705/7.17
See application file for complete search history.

(56) References Cited

U.S. PATENT DOCUMENTS

| | | | |
|---|---|---|---|
| 6,895,586 B1 * | 5/2005 | Brasher | G06F 9/465 709/201 |
| 7,047,529 B2 * | 5/2006 | Delo | G06F 8/61 717/174 |
| 7,051,071 B2 | 5/2006 | Stewart et al. | |
| 7,159,209 B1 | 1/2007 | Srinivasan et al. | |
| 7,162,509 B2 | 1/2007 | Brown et al. | |
| 7,203,929 B1 | 4/2007 | Vinodkrishnan et al. | |

(Continued)

OTHER PUBLICATIONS

Arturo I. Voras, B. Mihaljevic, M. Orlic, M. Pletikosa, M. Žagar, T. Pavic, K. Zimmer, I. avrak, V. Paunovic, I. Bosnic, and S. Tomic. Evaluating Open-Source Cloud Computing Solutions. IEEE, Date of Conference: May 23-27, 2011. (Year: 2011).*

Christos KalloniatisEmail author, Haralambos Mouratidis, Shareeful Islam Evaluating cloud deployment scenarios based on security and privacy requirements. Requirements Engineering, Nov. 2013, vol. 18, Issue 4, pp. 299-319. (Year: 2013).*

(Continued)

*Primary Examiner* — Hafiz A Kassim
*Assistant Examiner* — Abdallah A El-Hage Hassan
(74) *Attorney, Agent, or Firm* — Joseph Petrokaitis; Ryan, Mason & Lewis, LLP

(57) ABSTRACT

A method includes generating one or more computing deployment solutions, each of the one or more computing deployment solutions specifying one or more parameters for deployment of a corresponding computing solution. The method also includes evaluating adoption of the one or more computing deployment solutions by respective ones of a plurality of computing systems utilizing one or more component evaluators connected via a network to the plurality of computing systems. The method further includes generating one or more solution deployment adoption reports for respective ones of the one or more computing deployment solutions based on information obtained over the network from the plurality of computing systems, and presenting the one or more solution deployment adoption reports via a dashboard user interface.

20 Claims, 11 Drawing Sheets

(56) References Cited

U.S. PATENT DOCUMENTS

| | | | |
|---|---|---|---|
| 7,216,340 B1 | 5/2007 | Vinodkrishnan et al. | |
| 7,665,085 B2 | 2/2010 | Sundararajan et al. | |
| 7,756,735 B2 | 7/2010 | Sessions et al. | |
| 8,326,910 B2* | 12/2012 | Bobak | H04L 41/5012 709/200 |
| 9,690,575 B2* | 6/2017 | Prismon | G06F 8/71 |
| 2007/0255769 A1* | 11/2007 | Agrawal | G06Q 10/06 |
| 2008/0046299 A1* | 2/2008 | Simons | G06Q 10/0639 705/7.23 |
| 2009/0307685 A1* | 12/2009 | Axnix | G06F 8/60 717/174 |
| 2010/0161371 A1* | 6/2010 | Cantor | G06Q 10/063 705/7.11 |
| 2013/0318399 A1* | 11/2013 | Srebranig | G06F 11/3688 714/32 |
| 2015/0212893 A1* | 7/2015 | Pawar | G06F 16/128 707/649 |
| 2016/0139902 A1* | 5/2016 | Dimitrakos | G06F 8/61 717/120 |
| 2016/0274906 A1* | 9/2016 | Srinivasan | G06F 8/71 |
| 2017/0017505 A1* | 1/2017 | Bijani | G06F 9/44505 |

OTHER PUBLICATIONS

Maricela-Georgiana Avram. Advantages and challenges of adopting cloud computing from an enterprise perspective. Science Direct, Procedia Technology 12 (2014) 529-534, The 7th International Conference Interdisciplinarity in Engineering (INTER-ENG 2013). (Year: 2013).*

Roemer M. Alfelor, "Weather-Responsive Transportation Management," ITE Annual Meeting and Exhibit Compendium of Technical Papers, Aug. 2006, 9 pages.

A.J. Kirk et al., "Lexington Incident Detection System Evaluation Report," Kentucky Transportation Center, College of Engineering, University of Kentucky, Research Report KTC-05-37/LFUCG-02-1F, Nov. 2005, 41 pages.

Deepal Jayasinghe, "Mulini : Code Generation Tool for Automated Staging Application System," Communications & Strategies (CS7001), 2008, 6 pages.

C. Berchet et al., "The Implementation and Deployment of an ERP System: An Industrial Case Study," Computers in Industry—Special Issue: Current Trends in ERP Implementations and Utilisation, Aug. 2005, pp. 588-605, vol. 56, No. 6.

A. Johnson et al., "Integrated System Architecture and Technology Roadmap Toward WAMPAC," IEEE PES Innovative Smart Grid Technologies Conference (ISGT), Jan. 2011, 5 pages.

* cited by examiner

100

FIG. 2
200
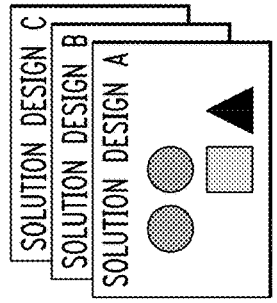
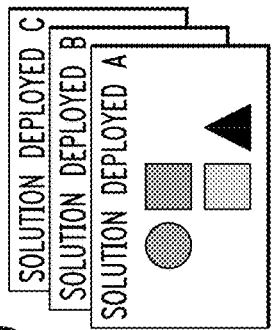
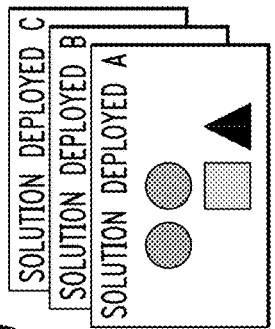

300

700

EVALUATING ADOPTION OF COMPUTING DEPLOYMENT SOLUTIONS

BACKGROUND

The present invention relates to governance, and more specifically, to evaluating deployment of governance solutions. In the information technology (IT) industry, governance affects various aspects of IT strategy. Managing different governance solutions can be a complex task, particularly as organizations grow and adopt various governance solutions. This task is further complicated as governance solutions themselves are more complex to deal with introduction of new technologies, methods, etc. to govern IT and other portions of an organization.

SUMMARY

Embodiments of the invention provide techniques for evaluating the adoption of computing deployment solutions.

For example, in one embodiment, a method comprises generating one or more computing deployment solutions utilizing a dashboard user interface of a solution deployment adoption analyzer, each of the one or more computing deployment solutions specifying one or more parameters for deployment of a corresponding computing solution, evaluating adoption of the one or more computing deployment solutions by respective ones of a plurality of computing systems utilizing one or more component evaluators of the solution deployment adoption analyzer connected via a network to the plurality of computing systems, generating one or more solution deployment adoption reports for respective ones of the one or more computing deployment solutions based on information obtained over the network from the plurality of computing systems, and presenting the one or more solution deployment adoption reports via the dashboard user interface of the solution deployment adoption analyzer, wherein the solution deployment adoption analyzer is implemented using at least one processing device comprising a processor coupled to a memory.

BRIEF DESCRIPTION OF THE DRAWINGS

FIG. 2 depicts evaluation of deployment solutions, according to an embodiment of the present invention.

DETAILED DESCRIPTION

Figure 1:
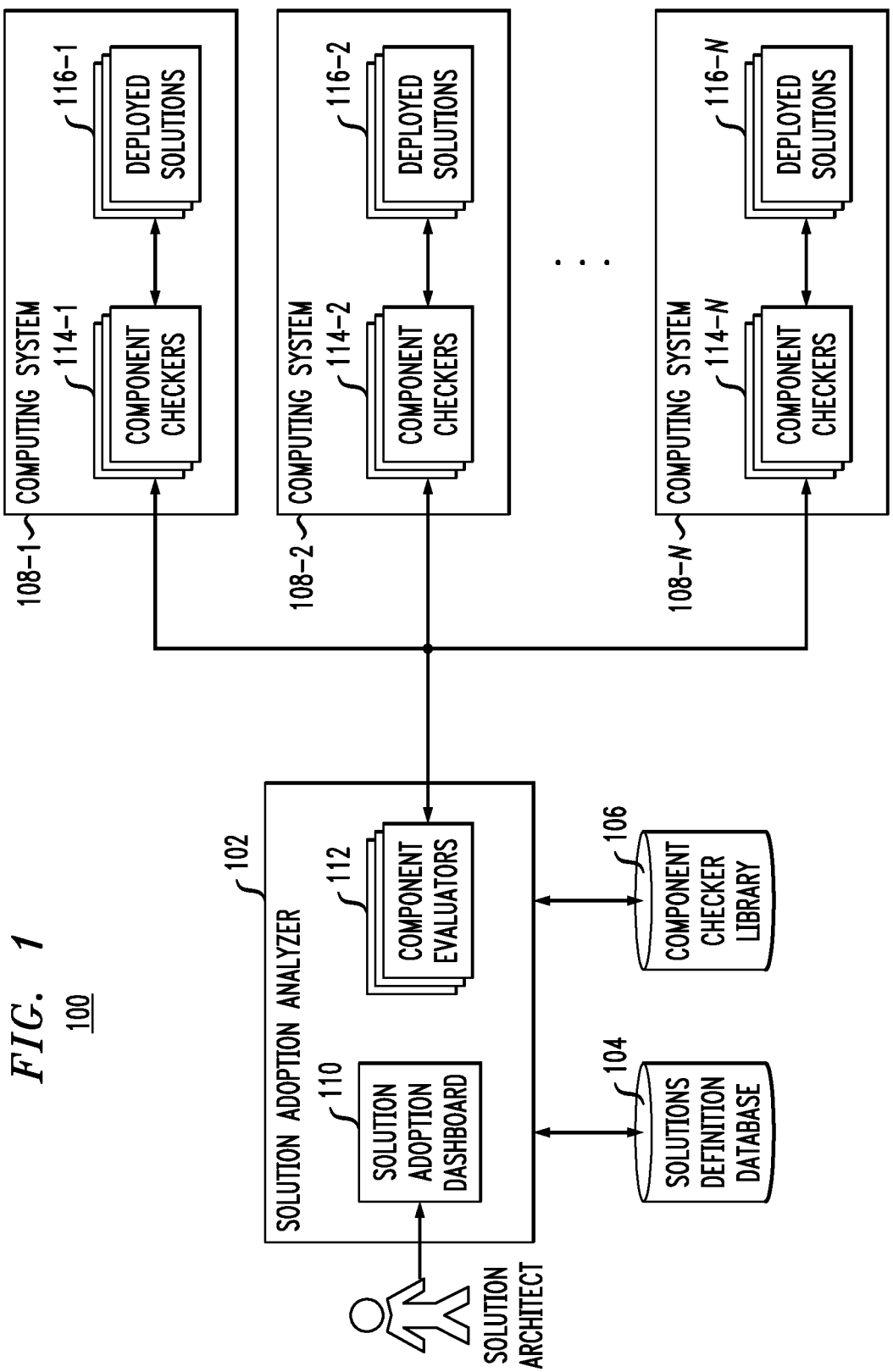
FIG. 1 depicts a solution adoption analyzer, according to an embodiment of the present invention.

Illustrative embodiments of the invention may be described herein in the context of illustrative methods, systems and devices for evaluating adoption of computing deployment solutions. However, it is to be understood that embodiments of the invention are not limited to the illustrative methods, systems and devices but instead are more broadly applicable to other suitable methods, systems and devices.

As discussed above, governance can impact various aspects of an IT strategy. Various organization and entities, such as businesses, governments, etc. implement multiple governance solutions. Keeping track of the various solutions deployed in an organization can be a daunting task. This may be due in part to the nature of the deployed solutions. Solutions, for example, continue to increase in complexity with the introduction of new technologies and methodologies. In addition, a large organization such as a global corporation often deploys solutions across the globe, by and with different teams from different nationalities with varying experience and expertise. Centralized, coordinated and efficient management of governance solutions is very challenging.

Governance solutions can be used for a variety of contexts. One category of governance solutions includes the aforementioned IT solutions. IT solutions, which may be designed by IT architects or consultants, affect various IT disciplines including, by way of example but not limited to, data management, systems management, web applications, Big Data, enterprise resource planning (ERP), customer relationship management (CRM), etc. Each solution can include multiple components, such as databases, application servers, operating systems, message brokers, etc. A governance or IT solution may be referred to herein as an "architecture" of computing resources.

Errors in the deployment of a given solution can affect the given solution itself, as well as other solutions that depend on the proper deployment of the given solution. Solution deployment may be evaluated using a manual checklist that is filled out by an IT team that deploys the given solution. Such checklists may indicate if an overall solution, or some portion or component thereof, was successfully deployed.

Manual evaluation of a deployed solution, however, presents a number of issues. For example, an IT team that deploys a solution may not have the expertise, skill or ability necessary to detect problems with the deployed solution. A complex solution may be susceptible to various subtle problems that are not easily detected by an IT team without the requisite expertise, skill or ability. A software engineering team, for example, may use the concept of Unity Testing to validate pieces of code. However, the software engineering team may not be able to validate a solution composed of several different software components using different technologies. As another example, an IT team may not want to report problems in solution deployment, due to internal or external pressures to get a solution deployed by a target date.

Embodiments of the invention provide techniques for evaluating the adoption of computing deployment solutions. Embodiments may be used, as an example, for supporting an IT organization or IT architects responsible for designing computing deployment solutions to automatically evaluate if a given computing solution was successfully deployed according to the solution design or definition. In some embodiments, solution adoption reports can be generated indicating how aligned a deployed solution was to the design, as well as to evaluate the performance of IT teams responsible for deploying the solution.

In some embodiments, evaluation of solution adoption is across different environments, by different teams and with different technologies. The environments may be geographically dispersed. For example, a given computing solution may be deployed in the Americas, Europe the Middle East and Africa (EMEA) and Asia-Pacific (AP). The IT teams responsible for deploying the computing solution in such different geographic regions may have different skill levels and expertise, and may use different technology. For example, the underlying physical computing resources used to deploy a software portion of a solution may differ by region. The different environments, however, need not be geographically distinct. As an example, a computing solution may be deployed in different cloud computing systems that are not necessarily geographically distinct from one another. In addition, multiple instances of a given solution may be deployed in the same cloud computing environment using the same or different underlying physical computing infrastructure.

FIG. 1 shows a system 100 including a solution adoption analyzer 102, a solutions definitions database 104, a component checker library 106 and computing systems 108-1, 108-2, . . . 108-N. Although not explicitly shown in FIG. 1, the elements shown may be connected to one another over one or more multiple networks of different types. Networks interconnecting elements in the system 100 may be, by way of example, a wide area network (WAN), a local area network (LAN), a cellular or other wireless network, etc.

The solution adoption analyzer 102 includes a solution adoption dashboard 110 and a plurality of component evaluators 112. The solution adoption dashboard 110 may be implemented as a web portal or other user interface, which permits a user such as a solution architect to define solution designs, display solution adoption results utilizing information gathered and compiled by the component evaluators 112, and various other tasks described in detail below.

The solutions definition database 104 may store deployment design solutions or definitions. A solution definition, for example, may include a number of different components along with steps and procedures to be utilized for deploying such components. A solution definition may also specify various parameters relating to its deployment. Various examples of such parameters are described below.

The parameters for a solution definition may include various workload parameters. Workload parameters may specify the processing loads of a computing solution at different ones of the computing systems 108. The workload parameters may include metrics that are determined based on previous workloads and previously deployed computing solutions. For example, if a solution definition is an update of an existing computing solution, workload information from the existing and previous versions of the computing solution may be used to calculate workload parameters for a new solution definition.

Workload parameters may be specified for the solution as a whole, for individual components of the solution, or both. For example, the workload parameters may include processing loads for application, database, and server components of a computing solution. Processing loads may include computing requirements such as processing power of components of the solution, storage requirements such as input/output (I/O) capacity, network requirements such as bandwidth, etc. The specification of workload parameters, as well as other types of parameters, on a per-component basis can be useful for evaluating the impact of deployment issues on individual components of the solution.

Criticality parameters may be used to specify how critical a solution or component thereof is, as well as the impact of a solution or component thereof on the overall computing system. For example, if a new deployment results in relatively small changes and has a low impact on the overall computing system, the solution definition may provide a standard deployment and monitoring check. On the other hand, if a new deployment results in significant changes and has a high impact on the overall computing system, the solution definition may require more detailed and strict monitoring checks.

Criticality parameters, however, need not be based solely on the changes and impact to the overall computing system. Different types of solutions may have different criticality parameters. For example, a solution definition for a payment system may have a higher criticality relative to an informational website, even if the payment system causes fewer changes to the overall computing system relative to the informational website.

The parameters may further include estimated implementation time parameters. Such parameters may specify an expected time for implementation of a computing solution at different computing systems. Similar to the workload parameters discussed above, estimated implementation time may be based on previous deployments and the known skills and expertise of the teams implementing the solution.

Estimated implementation time parameters may further specify when a solution is to be deployed. As an example, if an estimated deployment time is significantly long, the solution definition may specify that it is to be deployed overnight or on a weekend. As another example, if the estimated deployment time is considered long, the solution definition may specify that special attention is paid mostly towards an end of the time for deployment and component checks may have more critical monitoring at the later steps of the deployment.

Resource skill parameters specify the skill levels of deployment teams at different ones of the computing systems. The skill levels may indicated the qualifications, experience and/or expertise of a deployment team. The resource skill parameters may be specified in part based on previous deployments. As an example, if a deployment team has shown high expertise for complex deployments, then the solution definition may define standard monitoring checks. If a deployment team lacks expertise, or has had issues in previous deployments, the solution definition may define more rigorous monitoring checks.

Budget parameters may specify resource and infrastructure budgets for different computing systems. Different computing systems may have different limitations relating to the available infrastructure and resources capacity. The solution definition may specify component checks to evaluate the impacts of issues during deployment in part based on such limitations.

It is to be appreciated that the specific examples of parameters discussed above is not an exhaustive list of the possible parameters that may be used in embodiments. In addition, a particular embodiment need not use all, or even any of the above-described parameters. Embodiments may also use other parameters in addition to or in place of the above-described parameters.

The solution adoption analyzer 102 also includes component evaluators 112. The component evaluators 112 are configured to communicate, over one or more networks, with component checkers 114 at respective ones of the computing systems 108. In some embodiments, the component checkers 114 may be implemented at least in part internal to the solution adoption analyzer 102 as well as at least in part at respective ones of the computing systems 108.

The component evaluators 112 of the solution adoption analyzer 102 are configured to evaluate adoption of computing deployment solutions at respective ones of the computing systems 108, using information obtained from the component checkers 114 over one or more networks. The component evaluators 112 have the intelligence to evaluate a deployment based on the deployment design received from the solution definition. Evaluating adoption of a computing deployment solution may thus include determining whether the steps and procedures specified in the solution definition were followed. This may involve validating individual components of the computing deployment solutions or deployed solutions 116 at the computing systems 108.

To evaluate the deployed solutions 116, the component evaluators 112 may build component dependency graphs to analyze the impact of issues during deployment of the solutions. A component dependency graph may be built for one or more components of a given deployed solution, for a given deployed solution as a whole, or for a collection of multiple deployed solutions. Deployment results obtained over the network via the component checkers 114 at the computing systems 108 are used to identify issues associated with different components of the deployed solutions 116. The component dependency graph or graphs are used to determine the impact of such identified issues on the overall adoption of the deployed solutions 116.

The component checkers 114 may check individual software and hardware components of a deployed solution independently, and use the details and dependencies provided by the component dependency graphs to measure the impact of an issue with one component on the overall computing system. For example if a component of one of the deployed solutions 116-2 at computing system 108-2 is not correctly deployed, this issue may be propagated to other components of that solution as well as other deployed solutions. In such a manner, a seemingly minor issue with one component of a deployed solution may result in a major impact on the system as a whole.

The solution definition, as described above, may provide different deployment monitoring requirements according to design. For a given solution, the monitoring checks used by component checkers 114 may differ for respective ones of the computing system 108 based on the parameters described above, such as workload, criticality, estimated implementation time, time zones, resource skills, budget, etc. The component checkers 114 implement the monitoring checks, and report results to the component evaluators 112.

The solution adoption dashboard 110 may be utilized to develop, design or otherwise manage the component evaluators 112 and/or component checkers 114. For example, new component evaluators and component checkers may be developed for new designs and new systems, hardware, etc.

The component checker library 106 may include templates and designs for various component evaluators and component checkers. Such templates may be customized for use in a particular solution design. As an example, the component checker library 106 may include a database evaluator component. The database evaluator component can be extended or customized by a solution architect for a particular design based on the particular type of database used in that design. If a MySQL database is used but there is no existing MySQL evaluator, a new one may be defined and stored in the component checker library 106. A more detailed discussion of examples of component evaluators and component checkers is provided below with respect to FIGS. 4-7.

FIG. 2 illustrates evaluation of deployment solutions in a system 200. In the system 200, solution designs denoted A, B and C are deployed by three different teams—a United States (US) team, an EMEA team and an AP team. Each of the teams may receive a tutorial or other set of instructions for deploying the solutions A, B and C. Each of the teams may also receive a checklist used to verify correct deployment of the solutions A, B and C.

As shown in FIG. 2, a global governance team oversees the US, EMEA and AP teams, and seeks to determine whether the solutions A, B and C are being deployed according to design. In the system 200, individuals at the US, EMEA and AP teams self-report using the aforementioned checklists. For example, both the US and EMEA teams utilize the checklist and determine that the solutions were deployed as designed. The AP team utilizes the checklist and determines that there were minor issues during deployment.

The use of checklists that are completed manually by the US, EMEA and AP teams in the system 200 may lead to various problems. For various reasons, a checklist may generate false results that deployment was according to design. As discussed above, this may be due to a lack of skill or expertise by members of the teams filling out the checklist or a desire to avoid delay in deployment. Checklists may also underreport the severity of issues during deployment for similar reasons. Such problems are not necessarily limited to underreporting issues. For example, the use of a checklist may in some cases result in overreporting, such as mischaracterizing a minor issue as a major issue or mischaracterizing a non-issue as a minor or major issue.

Figure 3:
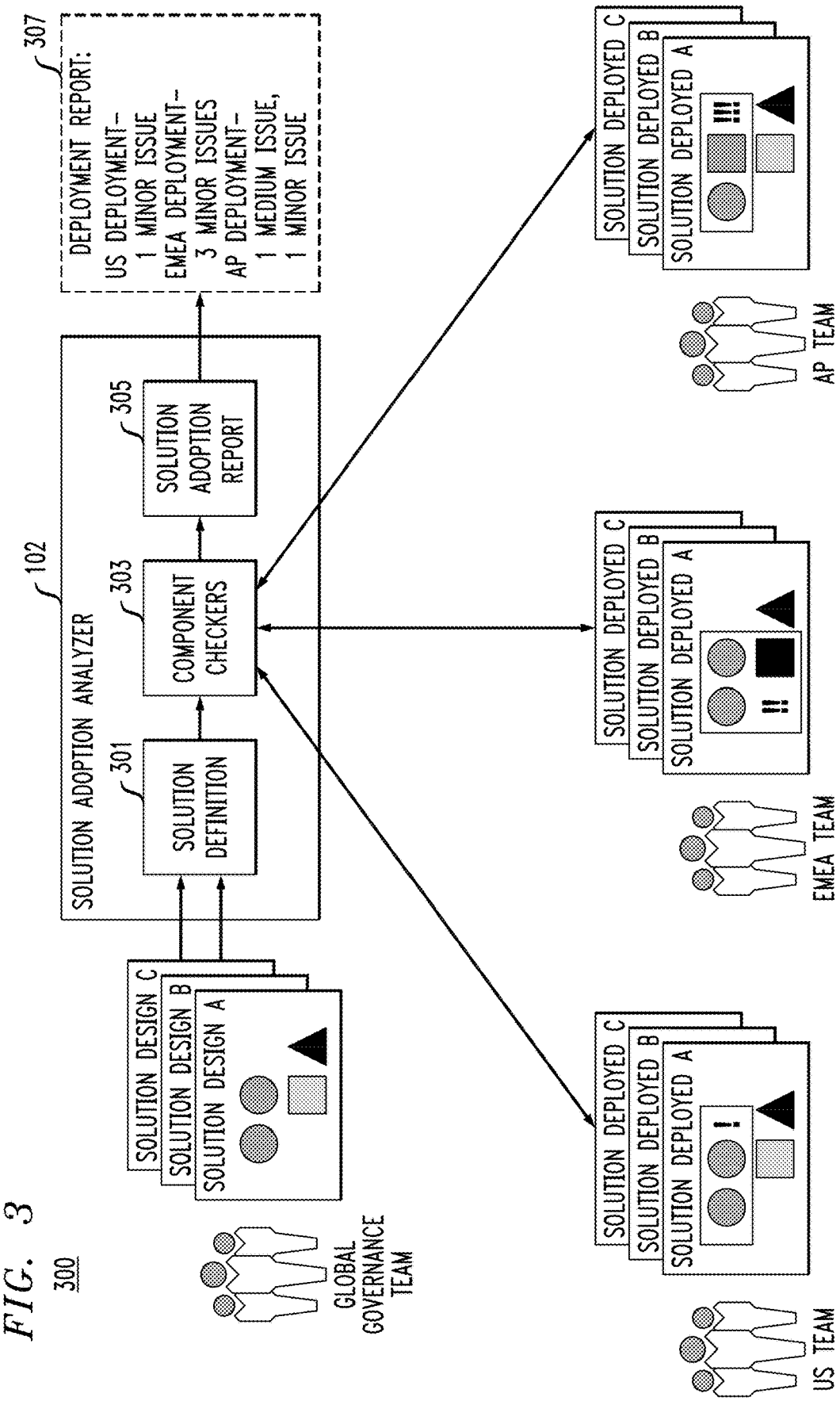
FIG. 3 depicts evaluation of deployment solutions utilizing the solution adoption analyzer of FIG. 1, according to an embodiment of the present invention.

FIG. 3 illustrates evaluation of deployment solutions in a system 300 utilizing the solution adoption analyzer 102. Similar to FIG. 2, solutions A, B and C are deployed by the US, EMEA and AP teams, and a global governance team seeks to determine whether the solutions A, B and C are deployed according to their respective solution designs. To do so, the global governance team utilizes solution adoption analyzer 102.

As shown in FIG. 3, the solution adoption analyzer includes a solution definition module 301, component checkers 303 and solution adoption report module 305. The modules 301 and 305 may be implemented by the solution adoption dashboard 110 described above with respect to FIG. 1. Also, while FIG. 3 illustrates component checkers 303 as being implemented internal to the solution adoption analyzer 102, embodiments are not limited to this arrangement. Instead, the component checkers 303 may be implemented in part by remote computing systems in which the solutions A, B and C are deployed by the US, EMEA and AP teams.

The solution adoption analyzer 102 allows for automatic evaluation of solution adoption, without the need for checklists that are manually completed by the US, EMEA and AP teams as in FIG. 2. The solution definition module 301, for example, designs deployment methodologies for the US, EMEA and AP teams. The deployment methodology may be different for each of the teams, according to the specific context of the computing systems managed by such teams.

For example, as discussed above various parameters such as workload parameters, cost parameters, etc. may affect the way in which a particular solution is deployed by a particular team. Various other factors and parameters, including the IT infrastructure, level of skill of the respective teams, time zones, etc. may affect the deployment methodology to be used by the US, EMEA and AP teams.

The component checkers 303 function in a manner similar to that described above with respect to the component evaluators 112 and component checkers 114 in system 100. The component checkers 303 monitor deployment of the solutions A, B and C and utilize component dependency graphs and deliver results to the solution adoption report module 305. The solution adoption report module 305 generates deployment reports, identifying issues in different regions and analyzing the impact of errors for the specific context of the regions.

As shown in FIG. 3, the deployment report 307 indicates that the US deployment had one minor issue, that the EMEA deployment had 3 minor issues, and that the AP deployment had 1 medium issue and 1 minor issue. Solution adoption reports such as deployment report 307 can be varied in different embodiments. For example, in some embodiments solution adoption reports are generated individually for each region such as the US, EMEA and AP regions. Solution adoption reports may also be generated for individual computing systems within a given region. As an example, the US team in FIG. 3 may deploy a solution in multiple different computing systems. A solution adoption report may be generated for such computing systems collectively or individually. A solution adoption report may also be generated for multiple regions, as shown in FIG. 3.

Solution adoption reports may also vary in the types of information presented. The example deployment report 307 in FIG. 3 identifies how many issues of each level (e.g., minor, medium, major) occurred for deployment in each region. A solution adoption report, however, need not take this format. A solution adoption report may use different labeling for issues, such as low, medium, high or critical. A solution adoption report may alternately not use any labeling for issues but instead identify the particular issues themselves. As an example, instead of identifying a problem with deployment of a filesystem for a server as a minor issue, a solution adoption report may indicate that the filesystem deployment was not successful, that there was insufficient space to create the designed filesystem, that an underlying hardware failure caused corruption of the filesystem, etc. A solution adoption report may also include combinations of the above information. For example, in the deployment report 307 shown in FIG. 3, the items may be selectable links that present additional details regarding the issues or the deployments generally.

Figure 4:
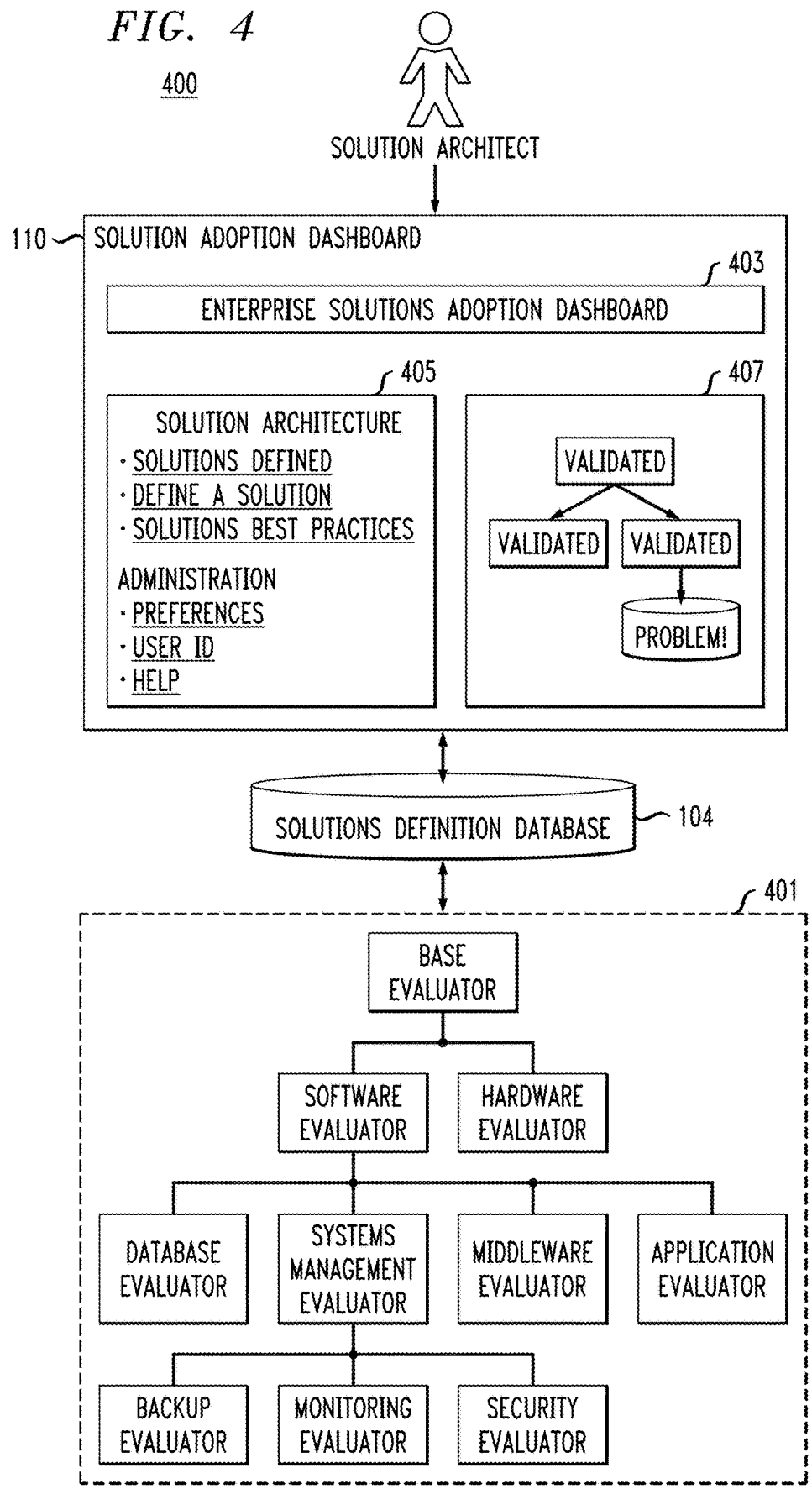
FIG. 4 depicts a solution deployment adoption report, according to an embodiment of the present invention.

FIG. 4 illustrates an example of a solution deployment adoption report. System 400 in FIG. 4 shows solution adoption dashboard 110 of the solution adoption analyzer 102, along with the solutions definition database 104 and a set of evaluator components 401 for a defined solution.

The solution adoption dashboard 110 in FIG. 4 presents a view of an enterprise solutions adoption dashboard 403 with a menu of selectable links 405 and a solution deployment adoption report 407. The menu of selectable links 405 includes a number of options under "Solution Architecture" allowing the solution architect to select amongst defined solutions, to define a new solution and to explore solution best practices. The menu of selectable links 405 further includes "Administration" links for preferences, user identification (ID) and help. The solution deployment adoption report 407 shows four components of a deployed solution, where three components have a "Validated" status indicating that there are no issues with the deployment and one component has a "Problem!" status indicating that there was an issue during deployment.

The solution definition database 104, as shown, includes a set of evaluator components 401. The set of evaluator components 401 are defined as part of the solution, and utilized in generating the solution deployment adoption report 407. The set of evaluator components 401 includes a base evaluator, which includes basic definitional components of a solution design. The software and hardware evaluator components inherit properties of the base evaluator and provide further definition of the hardware and software to be used in a particular solution, as well as the monitors and checks to be used in evaluating whether deployment of a given solution was according to design. The example set of evaluator components 401 includes a number of evaluators that inherit the properties of the software evaluator, including a database evaluator, a systems management evaluator, a middleware evaluator and an application evaluator. The set of evaluator components 401 further includes a number of evaluators that inherit the properties of the systems management evaluator, including a backup evaluator, monitoring evaluator and a security evaluator.

The set of evaluator components 401 are part of the design of a solution, and specify operation of the aforementioned component evaluators 112 and component checkers 114. As an example, the database evaluator specifies the parameters for a database included in a given solution, as well as the checks and monitors to be used in determining whether a deployment includes the correct database with the right parameters. It is important to note that the particular set of evaluator components used for solutions will vary according to design. Thus, the set of evaluator components 401 shown in FIG. 4 is presented by way of example only.

Embodiments are not limited solely to the evaluator components shown in FIG. 4. For example, although not specifically shown, there may be various hardware evaluators such as storage evaluators, compute evaluators and networking evaluators. Storage evaluators may include evaluators designed for various types of storage devices and systems, such as internal storage including hard drives and solid state storage, network attached storage (NAS), etc. Compute evaluators may include evaluators designed for various types of computing resources, such as different processing architectures including general purpose central processing units (CPUs), field programmable gate arrays (FPGAs), application specific integrated circuits (ASICs), etc. Networking evaluators may include evaluators for different types of networking resources, such as routers, switches, etc. Further details regarding evaluator components will be provided below in the discussion of FIGS. 6 and 7.

Figure 5:
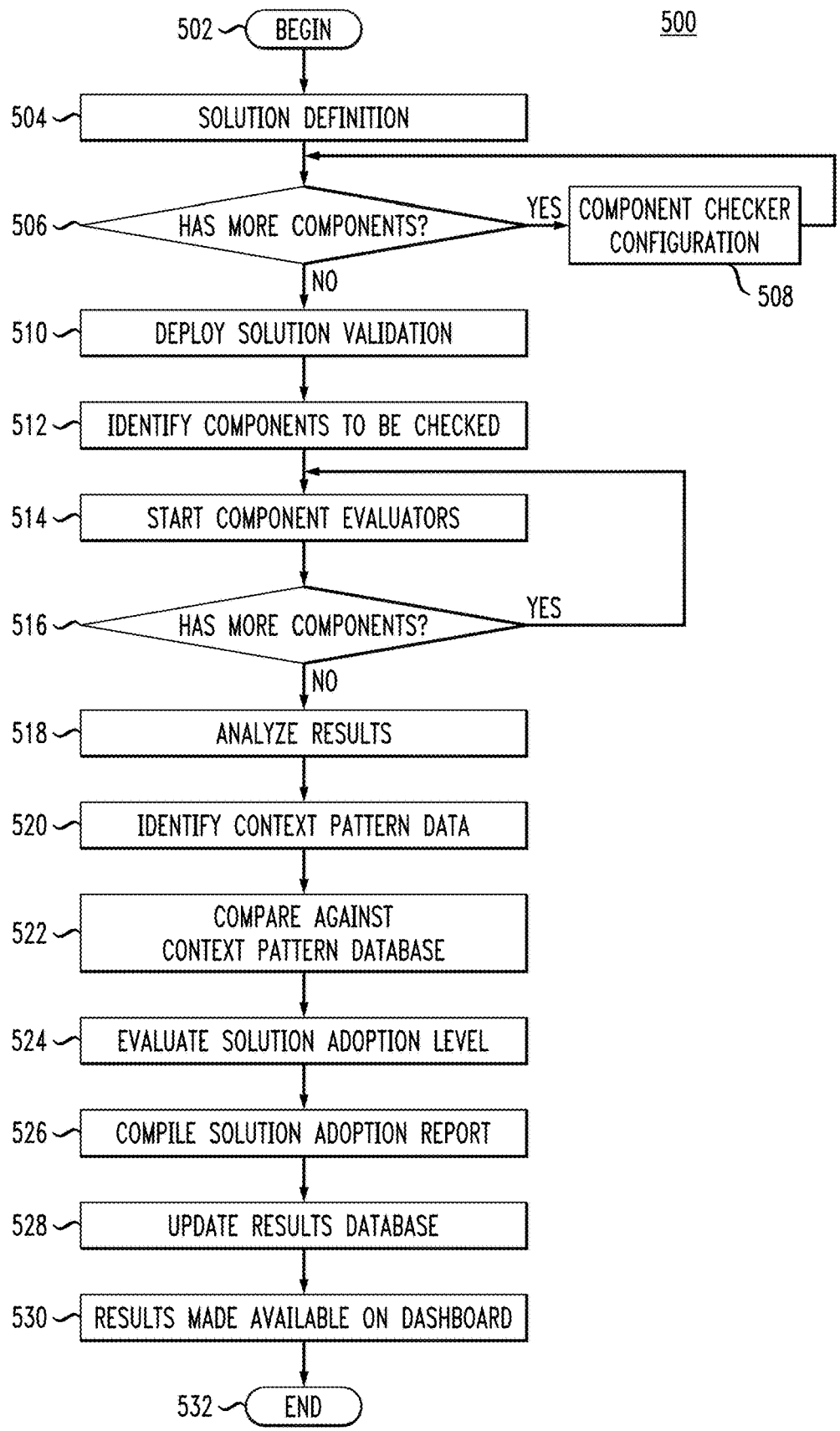
FIG. 5 depicts a process for generating a solution deployment adoption report, according to an embodiment of the present invention.

FIG. 5 depicts a process 500 for generating a solution deployment adoption report, such as the solution adoption deployment report 407 shown in FIG. 4 or the deployment report 307 shown in FIG. 3. In some embodiments, the process 500 is performed by the solution adoption analyzer 102. It is important to note, however, that the solution adoption analyzer 102 need not perform all steps of the process 500 in embodiments of the invention. In some embodiments, portions of the process 500 may be performed by computing and processing devices external to the solution adoption analyzer 102 that are configured to communicate with the solution adoption analyzer 102 over one or more networks. As an example, the component checkers 114 at computing systems 108 shown in FIG. 1 may perform portions of the process 500.

The process 500 begins 502 with generating a solution definition in step 504. In some embodiments, step 504 involves a solution architect defining a new solution. In other embodiments, step 504 involves selecting or customizing a solution template stored in a database such as the solutions definition database 104 shown in FIG. 1. Step 502 can include selecting parameters for the solution as well. The solution definition includes procedures and steps to be used in deploying the solution.

After solution definition in step 504, step 506 is performed to check whether the solution definition has additional components to be configured. If yes, the process 500 proceeds with step 508, where a component checker is configured. Configuring a component checker includes designing the monitoring and checks to be utilized in determining whether the component of the solution definition is deployed as defined. Further details regarding component checker configuration will be discussed in detail below with respect to FIGS. 6 and 7. After each component is configured in step 508, the process 500 returns to step 506. Once step 506 determines that there are no additional component checkers to be configured, the process 500 proceeds to deploying solution validation in step 510.

After the solution validation is deployed in step 510, the process identifies the components to be checked in step 512. In step 514, the component evaluator for an identified component is started. Step 514 is repeated until there are no additional component evaluators to start, as indicated by the loop shown including decision step 516. Once decision step 516 determines that there are no additional component evaluators to start or run, the process 500 proceeds to step 518, where results obtained from the component evaluators are analyzed. As discussed above with respect to FIG. 1, results may be obtained by component evaluators 112 from component checkers 114 implemented at least in part by computing systems 108 with deployed solutions 116.

After analyzing the results in step 518, context pattern data is identified in step 520. The context pattern data is identified in part by analyzing attributes of the deployed solutions, including workload information, estimated implementation time, time of day, time zone, resource skills, etc. In some embodiments, a context sensitive pattern evaluation engine is used, along with a context pattern database. The context sensitive pattern evaluation engine may be implemented by the solution adoption dashboard 110 of solution adoption analyzer 102. The context pattern database may be part of the solutions definition database 104 or a separate database. The context sensitive pattern evaluation engine uses predictive models to identify attributes of the computing systems and deployed solutions.

Context based data correlation and pattern discovery can utilize statistical, machine learning and/or artificial intelligence techniques. Examples of machine learning and statistical techniques include, but are not limited to, supervised learning such as decision trees, support vector machines, neural networks, case based reasoning, k-nearest neighbor, unsupervised learning such as self-organizing maps, k-means, expectation maximization, statistic-based learning such as logistic regression, naïve Bayes, discriminant analysis, isotonic separation, and other techniques such as genetic algorithms, group methods, fuzzy sets, rules-based models, etc. Predictive models used to identify context sensitive pattern data can be implemented using one of or a combination of the above-described models.

In some embodiments, multiple models are used. In such embodiments, the context sensitive pattern evaluation engine can receive scores or other data from each of the multiple models and apply different weights to such scores or data. The weights may depend on the importance, accuracy or other characteristics of the different models. The scores or other data from the multiple models are used to calculate a final score or other results. The weights used are adjusted and improved over time by calibrating the models with the arrival of new information and feedback.

Context pattern data may take a variety of forms. As an example, high criticality parameters and low resource skills for a team may cause an estimated deployment time for a solution to be significantly long. As another example, for specific geographic regions and workload types, the probability for successful deployment may be higher at a particular time of the day (e.g., at night) or particular days of the week (e.g., weekend days). Various other types of context pattern data may be used in different embodiments.

After identifying the context pattern data in step 520, such data is compared against information from the context pattern database. The results of this comparison are used, in combination the results from the component checkers and component evaluators, in evaluating the solution adoption level in step 524. The solution adoption level may be considered on a per-solution basis, a per-component basis, or both. For example, the overall solution may be assigned a solution adoption level indicating whether it was successfully deployed according to its definition. In addition or in the alternative, solution adoption levels may be assigned to different components of a solution indicating whether respective components of the solution were deployed according to definition.

In some embodiments, the solution adoption level 524 may be binary, e.g., the solution and/or component was either successfully deployed or the solution was not successfully deployed. In other embodiments, different types of solution adoption levels are used. As an example, a deployment with only relatively minor issues may be considered partially successful, while deployments with major issues may be considered unsuccessful or incomplete. The solution adoption level may take various other forms in other embodiments, including by way of example numerical scores (e.g., 1 to 10), alphabet grades (e.g., A to F), etc.

As noted above, the solution adoption level is used to indicate if a solution or component thereof was actually deployed according to its definition. The solution definition itself may define certain types of issues that degrade the solution adoption level. For example, the solution definition may specify that failure to successfully deploy a particular component (e.g., a database, server, etc.) of the solution results in dropping one letter grade (e.g., A to B) or some specified numerical drop (e.g., from 10 to 9) for the overall solution. The solution definition may alternatively specify certain core or critical components of the solution, any of which results in a failing or unsuccessful solution adoption level. The solution adoption level may also be affected by implementation time. For example, the solution definition may specify that the solution is to be implemented in 2 hours. If all components of the solution are successfully deployed, but deployment takes 4 hours, the solution adoption level may indicate that deployment was not successful. Various other factors may be used in determining the solution adoption level for a particular deployment.

Utilizing the solution adoption level, the process 500 compiles a solution adoption report in step 526. The solution adoption report may include various types of information as described above. After compiling the solution adoption report, the process 500 continues with updating one or more results databases. This may involve, for example, updating information in the context pattern database, the solutions definition database 104, and/or the component checker library 106. The solution adoption report is also made available on the solution adoption dashboard 110 in step 530, and the process 500 ends in step 534.

It is to be appreciated that the process 500 may be performed before, during and/or after deployment of a given solution. If performed during deployment of the given solution, the process 500 may be considered as online. If performed in part before or after deployment of the given solution, the process 500 may be considered offline.

A solution definition may be generated by defining its various components. For example, a given solution may be composed of a number of IT components based on software and/or hardware. Hardware components include, by way of example, server hardware, storage hardware, network hardware, etc. Software components include, by way of example, operating systems, middleware, databases, applications, systems management, etc.

An expandable framework, which may be based on object oriented programming principles, can be used to define the solution using a number of component checkers. Such a framework may include a high level interface for each type of component that needs to be checked. For example, starting with a parent "Base Evaluator" component, "Software Evaluator" and "Hardware Evaluator" components can be defined. Additional levels may be developed, down to the component that actually represents a piece of a defined solution to be checked, such as International Business Machines (IBM®) Advanced Interactive eXecutive (AIX®) related validation, IBM® DB2® database related validation, IBM® WebSphere® related validation, etc.

Component checkers may include pieces of computer code that implement validation algorithms. Such code may use a solution definition component as input, implement component validation algorithms using available application programming interfaces (APIs), and provide a solution evaluator report as output. A component checker may be implemented by loading code into a computing system that runs a deployed solution. A component checker may alternatively be implemented using specialized hardware configured to communicate over a network with the computing system running a deployed solution. For example, in performing checks on networking components of a deployed solution, network probes or sensors may be utilized to measure bandwidth, throughput, response times, etc. Such network probes and sensors may be implemented in part by the solution adoption analyzer 102, or some other processing device external to both the solution adoption analyzer 102 and the computing system deploying a solution.

Figure 7:
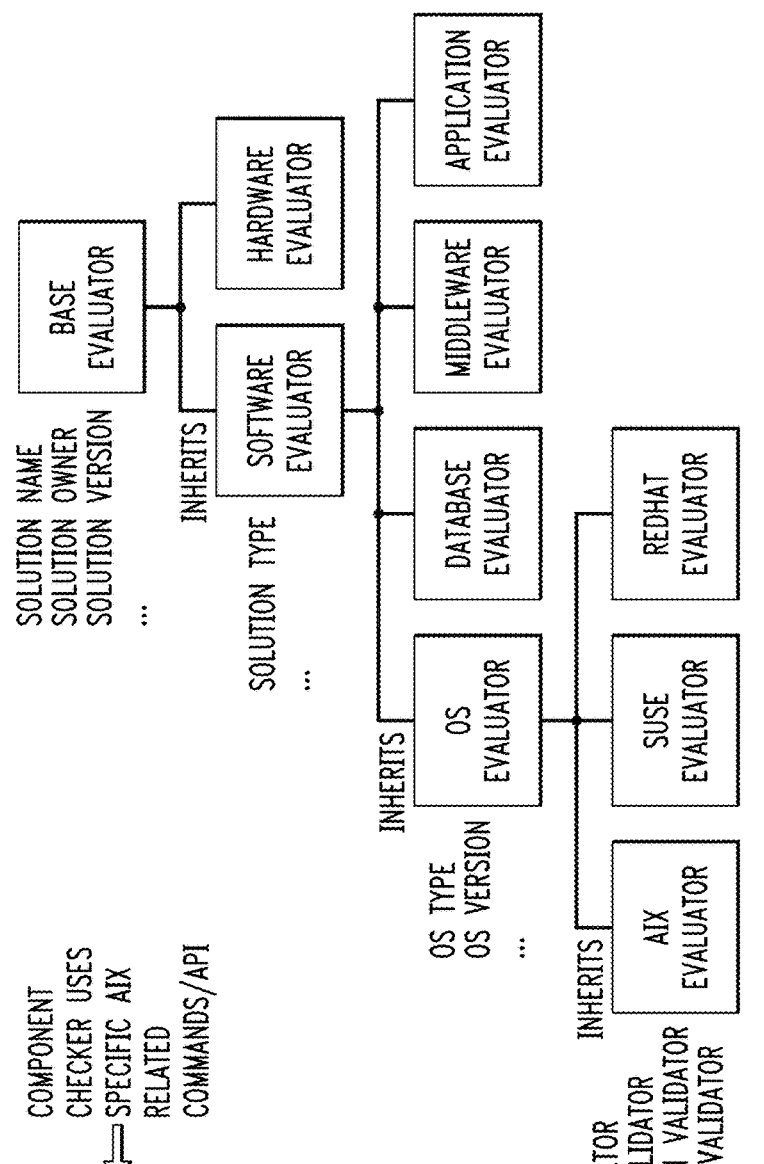
FIG. 7 depicts an example of component checkers used for a deployment solution, according to an embodiment of the invention.

The component checker framework may be implemented by the solution adoption dashboard 110 of solution adoption analyzer 102 in conjunction with the component checker library 106 and information from solutions definition database 104. Using the component checker framework, a solution can be developed in phases, progressing from one level of the component checker framework to another. FIG. 4 shows an example set of evaluator components 401 arranged in such a hierarchy. FIG. 7, which will be discussed in detail below, shows another example.

As an example, a first phase may focus on software evaluators such as operating system (OS) checkers. OS checkers may be developed for various commonly used OSs, such as AIX®, Red Hat® Linux, SUSE® Linux, Microsoft® Windows®, Hewlett-Packard UniX (HP-UX®), Oracle® Solaris, etc. Each OS checker would follow the OS Evaluator Interface, which follows the Software Evaluator interface, which follows the Base Evaluator Interface. A component checker for AIX® uses AIX® specific APIs and commands to implement the checker functions defined in the OS Evaluator interface. Similarly, component checkers for Microsoft® Windows® would use Windows® specific APIs and commands to implement the checker functions defined in the OS Evaluator interface. Other OS-specific component checkers would be developed in a similar fashion to utilize that OS's APIs and commands to implement the checker functions defined in the OS Evaluator interface.

Component checkers for other types of software and hardware may be defined and developed in a similar manner. With a broad library of component checkers, an end user such as the solution architect need not understand how each component defined in a particular solution will be validated. Instead, the components are selected in the solution definition using the solution adoption dashboard 110. Once deployed, the component checkers will use the defined algorithms to validate the selected components. In some embodiments, the solution adoption dashboard 110 will automatically select the appropriate component checkers based on the solution definition, evaluate the deployments for a given solution, compile and consolidate results, add context related information such as the team responsible for deployment, the time spent on deployment, skill related issues, possible human error issues, etc., and generate a solution adoption report.

Figure 6:
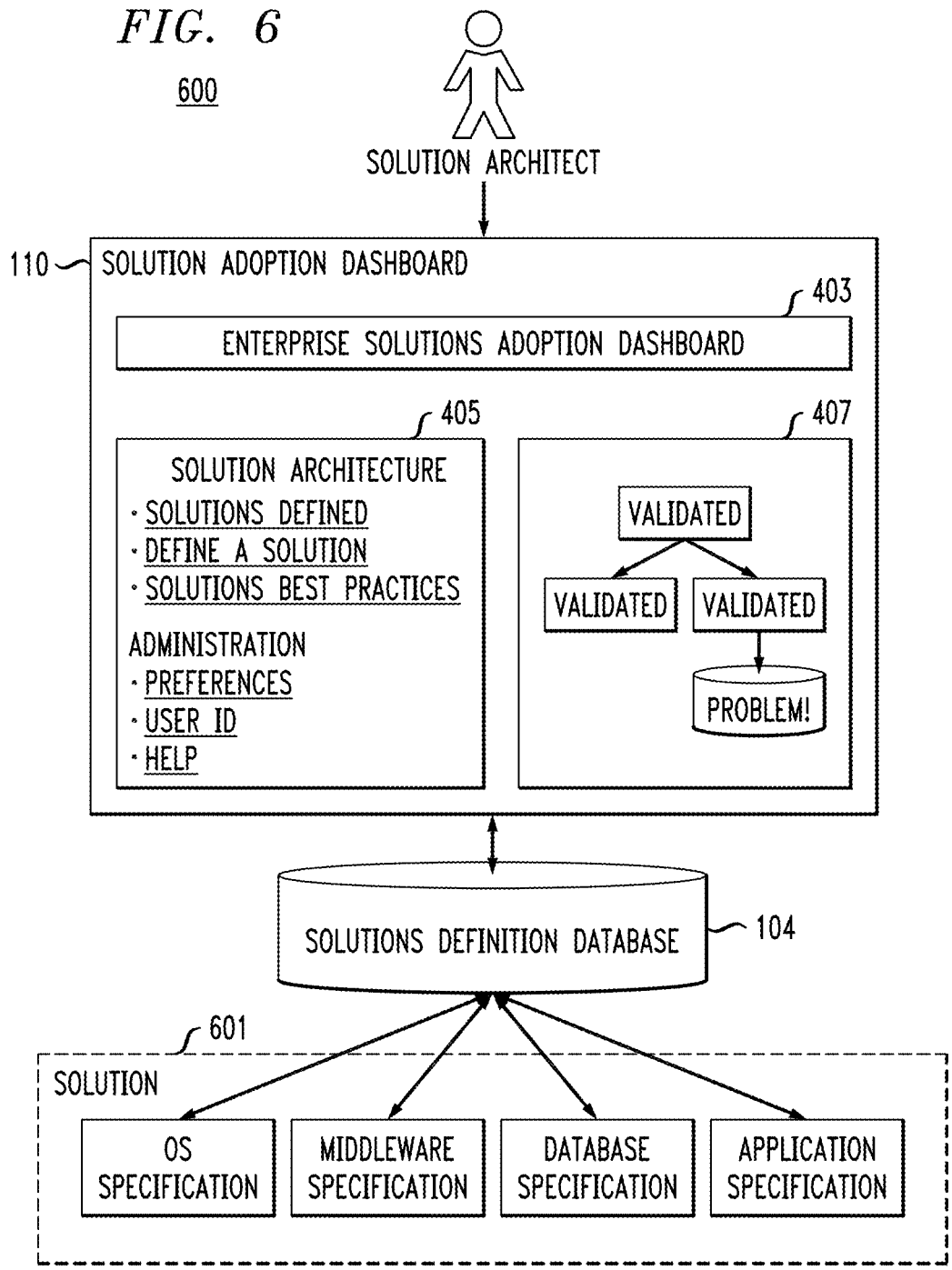
FIG. 6 depicts generation of a deployment solution, according to an embodiment of the present invention.

FIG. 6 illustrates generation of a solution definition. The system 600 shown in FIG. 6 includes the solution adoption dashboard 110 as shown in FIG. 4, along with the solutions definition database 104 and solution definition 601. To define a solution, the solution architect may select the "Define a solution" link from the menu of selectable links 405 in the solution adoption dashboard 110.

In the system 600 shown in FIG. 6, the solution definition 601 includes OS specifications, middleware specifications, database specifications and application specifications. Utilizing the solution adoption dashboard 110, every aspect of the solution definition may be defined, including where the solution is to be deployed and the teams responsible for deploying and configuring the solution. In the particular example of FIG. 6, it is assumed that the OS specification is an AIX® server, the middleware specification is a WebSphere® server, the database specification is a DB2® server and the application specification is a Java 2 Platform, Enterprise Edition (J2EE) application. Each of these components has specific details that are part of the solution definition and design.

For example, the AIX® Server specification may include 2 central processing units (CPUs) at 1.8 GHz, 8 GB of random access memory (RAM), AIX® 7 OS, and a filesystem as follows:

/ –500 MB
/tmp –1 GB
/var –2 GB
/usr –2 GB
/opt –10 GB

The WebSphere® server specification may specify that WebSphere® 8 is to be used, with Lightweight Directory Access Protocol (LDAP) authentication, Transport Layer Security (TLS) connections and a high performance Java Container configuration.

The DB2® database specification may specify that DB2® V10 is to be used, with daily backups and defined schema such as tables, relationships and indexes.

The J2EE application specification may specify particular servlets, JavaServer Pages (JSPs), Enterprise Java Beans (EJBs), data sources and security configurations.

FIG. 7 illustrates a component evaluator framework 700 to be used with the solution definition 601. Particularly, the component evaluator framework 700 shows details regarding the validation algorithms and checks to be used for the AIX® server. The AIX evaluator will include algorithms for monitoring and validating the CPU, memory, OS version and filesystem parameters of the deployed solution. FIG. 7 specifically shows an example of code used to implement a filesystem validation algorithm of the AIX® Evaluator.

The solution adoption dashboard 110 identifies the component checkers to be used for the selected components from the component checker library 106 and remotely evaluates solution deployment at different computing systems by different teams. This may involve gathering deployment, configuration and context related information such as the team name, team members, deployment time, etc. The solution adoption dashboard 110 further presents results showing how aligned respective deployments are to their defined solutions. Using historical data from the solutions definition database 104, the solution adoption dashboard 110 can also show context related information for each deployment, such as how long it took to deploy, trends for past deployments made by the respective teams pointing to possible skill problems or human error, etc.

Figure 8:
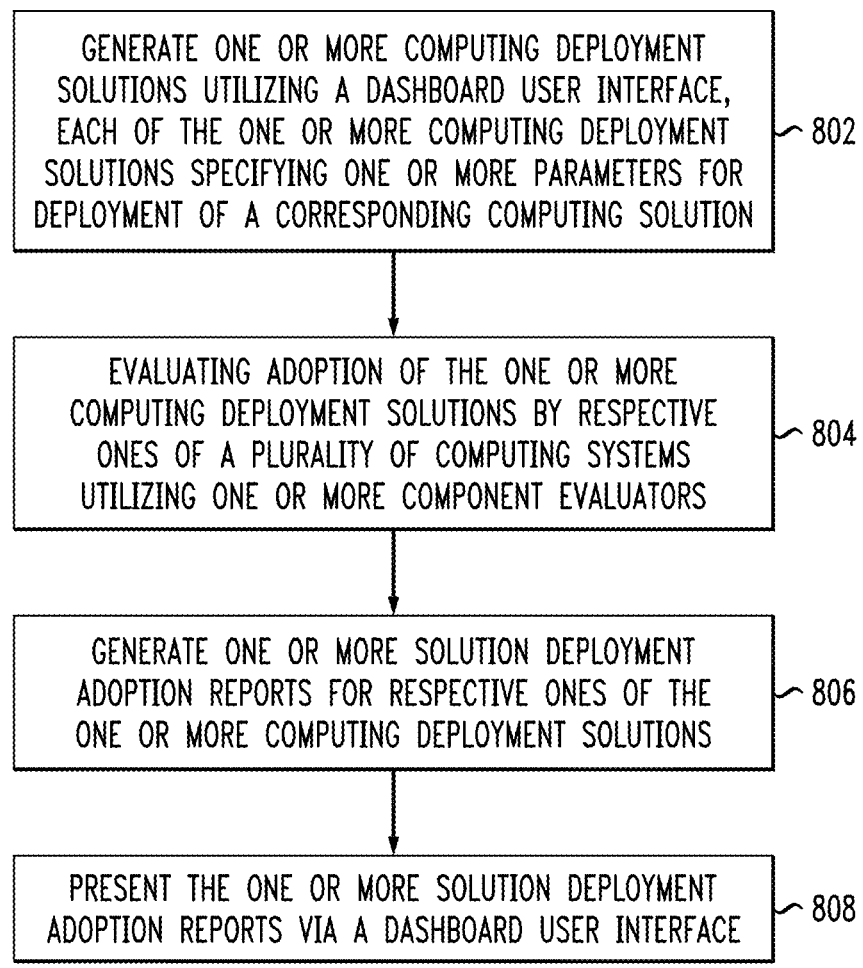
FIG. 8 depicts a process for evaluating adoption of deployment solutions, according to an embodiment of the invention.

FIG. 8 illustrates a process 800 for evaluating adoption of deployment solutions. The process 800 may be performed by the solution adoption analyzer 102. Process 800 begins with step 802, generating one or more computing deployment solutions utilizing a dashboard user interface, each of the one or more computing deployment solutions specifying one or more parameters for deployment of a corresponding computing solution. The dashboard user interface may be a graphical user interface (GUI) provided by the solution adoption dashboard 110 of solution adoption analyzer 102.

Process 800 continues with evaluating 804 adoption of the one or more computing deployment solutions by respective ones of a plurality of computing systems utilizing one or more component evaluators, such as component evaluators 112 of the solution adoption analyzer 102. As described above, the component evaluators 112 communicate over a network with component checkers 114 implemented by computing systems 108.

In step 806, one or more solution deployment adoption reports are generated for respective ones of the one or more computing deployment solutions based on information obtained over the network from the plurality of computing systems. The solution deployment adoption reports are presented in step 808 via the dashboard user interface.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
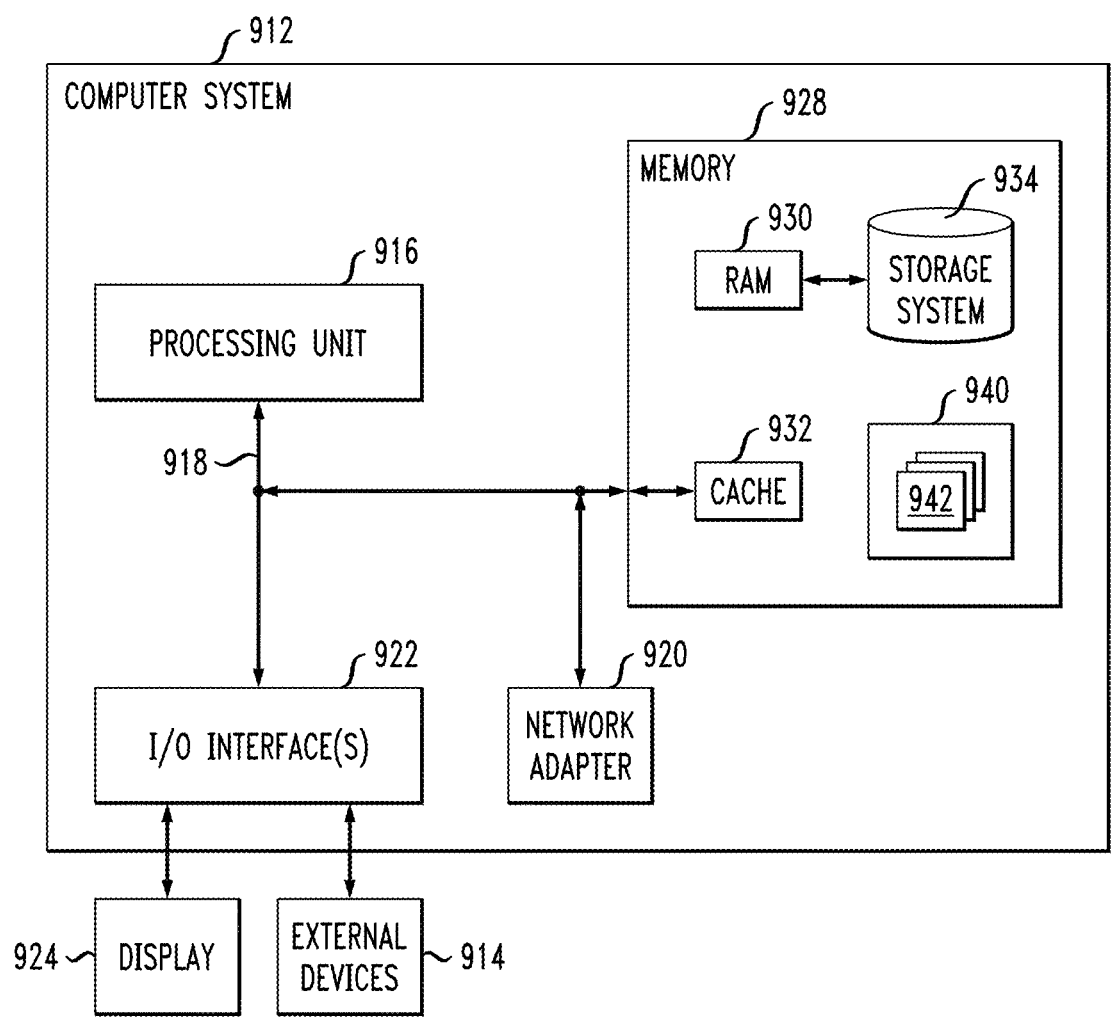
FIG. 9 depicts a computer system in accordance with which one or more components/steps of techniques of the invention may be implemented, according to an embodiment of the invention.

One or more embodiments can make use of software running on a general-purpose computer or workstation. With reference to FIG. 9, in a computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as random access memory (RAM) 930 and/or cache memory 932. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 918 by one or more data media interfaces. As depicted and described herein, the memory 928 may include at least one program product having a set (e.g., at least one) of program modules that are configured to carry out the functions of embodiments of the invention. A program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via I/O interfaces 922. Still yet, computer system/server 912 can communicate with one or more networks such as a LAN, a general WAN, and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples include, but are not limited to, microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
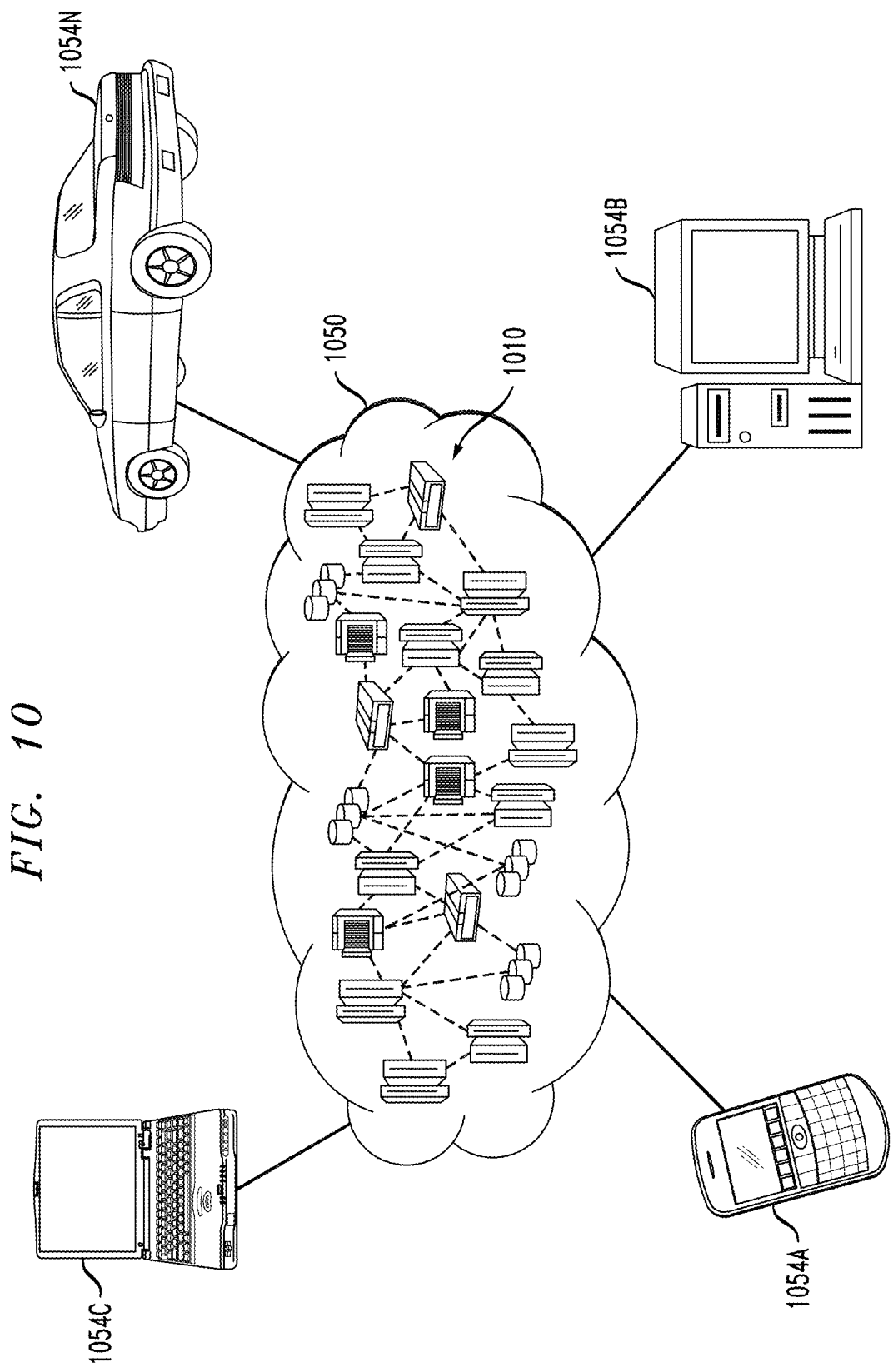
FIG. 10 depicts a cloud computing environment, according to an embodiment of the present invention.

Referring now to FIG. 10, illustrative cloud computing environment 1050 is depicted. As shown, cloud computing environment 1050 comprises one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
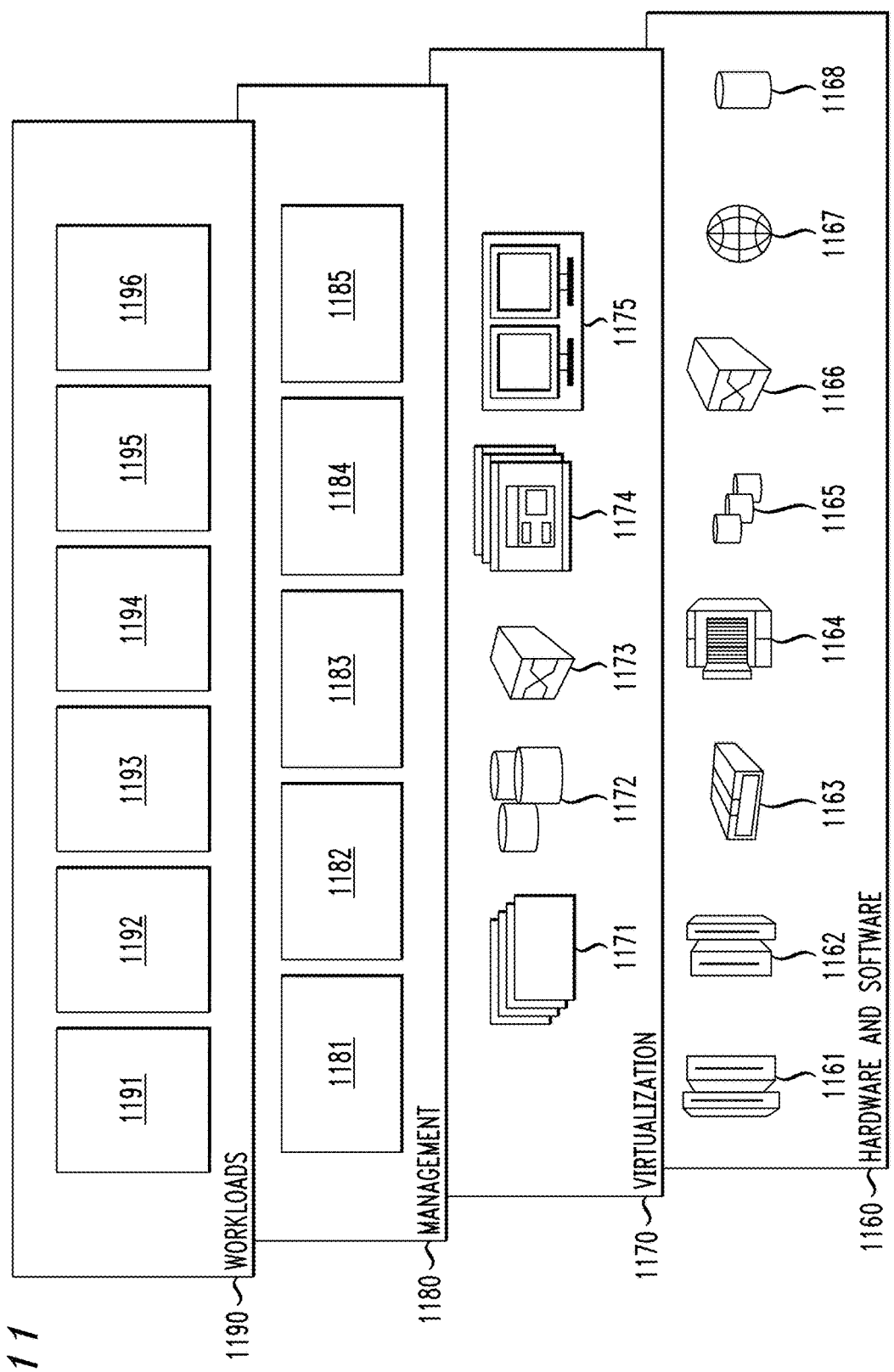
FIG. 11 depicts abstraction model layers, according to an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and a solution deployment adoption analyze 1196, which may perform one or more of the functions described above with respect to solution adoption analyzer 102.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
generating one or more computing deployment solutions utilizing a dashboard user interface of a solution deployment adoption analyzer, each of the one or more computing deployment solutions specifying one or more parameters for deployment of a corresponding computing solution;
selecting, from a hierarchical evaluator framework, a set of component-specific evaluators specifying checks and validation algorithms for use in component checkers for software and hardware components of the one or more computing deployment solutions;
modifying the checks and validation algorithms for use in components checkers for software and hardware components of at least a given one of the computing deployment solutions based at least in part on an identity of a set of users responsible for adopting the given computing deployment solution at a given one of the plurality of computing systems;
evaluating adoption of the one or more computing deployment solutions by respective ones of a plurality of computing systems utilizing one or more component evaluators of the solution deployment adoption analyzer connected via a network to the plurality of computing systems;
generating one or more solution deployment adoption reports for respective ones of the one or more computing deployment solutions based on information obtained over the network from the plurality of computing systems; and
presenting the one or more solution deployment adoption reports via the dashboard user interface of the solution deployment adoption analyzer;
wherein the solution deployment adoption analyzer is implemented using at least one processing device comprising a processor coupled to a memory; and
wherein evaluating adoption of the one or more computing deployment solutions comprises, for the given computing deployment solution comprising one or more software components and one or more hardware components:
building a component dependency graph for the one or more software components and the one or more hardware components of the given computing deployment solution;
deploying a given component checker at a given one of the one or more software components or the one or more hardware components of the given computing deployment solution;
evaluating deployment of the given software or hardware component independent of one or more other ones of the software and hardware components of the given computing deployment solution utilizing the given component checker; and
utilizing the component dependency graph to analyze impact of one or more issues associated with the given software or hardware component on one or more other ones of the software and hardware components of the given computing deployment solution; and
wherein the hierarchical evaluator framework comprises:
a first level with a base evaluator associated with name, owner and version properties of the given computing deployment solution;
a second level with solution type evaluators associated with different solution type properties, wherein each of the solution type evaluators in the second level inherit the name, owner and version properties associated with the base evaluator, and wherein the solution type evaluators comprise a software component evaluator associated with a software solution type property and a hardware component evaluator associated with a hardware solution type property; and at least one additional level comprising one or more component-specific evaluators that inherit the name, owner and version properties associated with the base evaluator in the first level and a solution type property associated with one of the solution type evaluators in the second level.

2. The method of claim 1, wherein generating the one or more computing deployment solutions further comprises defining the one or more computing deployment solutions.

3. The method of claim 2, wherein defining the one or more computing deployment solutions comprises selecting the one or more computing deployment solutions from a solutions definition database.

4. The method of claim 2, wherein defining the one or more computing deployment solutions comprises selecting values of the one or more parameters for the one or more computing deployment solutions.

5. The method of claim 1, wherein the one or more parameters for the one or more computing deployment solutions comprise:
  a workload parameter specifying processing loads of the one or more computing deployment solutions at respective ones of the plurality of computing systems;
  a criticality parameter specifying criticality and impact of deploying the one or more computing deployment solutions at respective ones of the plurality of computing systems;
  an estimated implementation time parameter specifying an expected time for implementation of the one or more computing deployment solutions at respective ones of the plurality of computing systems;
  a resource skills parameter specifying skill levels of deployment teams at respective ones of the plurality of computing systems; and
  a budget parameter specifying resources and infrastructure budgets for respective ones of the plurality of computing systems.

6. The method of claim 1, further comprising identifying one or more component checkers to be utilized in evaluating adoption of the one or more computing deployment solutions, wherein each component checker permits verification of a configuration of at least one of a hardware component and a software component of the one or more computing deployment solutions.

7. The method of claim 6, wherein identifying the one or more component checkers comprises selecting the one or more component checkers from a component checker library.

8. The method of claim 6, wherein identifying the one or more component checkers comprises defining a new component checker.

9. The method of claim 6, wherein the one or more component checkers including the given component checker are implemented external to the solution deployment adoption analyzer at the plurality of computing systems.

10. The method of claim 9, wherein the one or more component checkers are configured to utilize application programming interfaces of the plurality of computing systems to compile evaluation results for respective components of the one or more computing deployment solutions.

11. The method of claim 6, wherein the one or more component checkers comprise:
  at least one hardware evaluator configured to verify a configuration of one or more hardware components of the one or more computing deployment solutions; and
  at least one software evaluator configured to verify a configuration of one or more software components of the one or more computing deployment solutions.

12. The method of claim 11, wherein the at least one software evaluator comprises one of: an operating system evaluator; a database evaluator; a middleware evaluator; and an application evaluator.

13. The method of claim 6, wherein evaluating adoption of the one or more computing deployment solutions comprises:
  receiving verification of component configurations of the one or more computing deployment solutions at respective ones of the plurality of computing systems via the one or more component checkers;
  identifying context sensitive pattern data for one or more attributes of respective ones of the plurality of computing systems; and
  evaluating a solution deployment adoption level for respective ones of the computing systems based on verification of the component configurations and the context sensitive pattern data.

14. The method of claim 13, wherein evaluating the solution deployment adoption level comprises identifying whether respective ones of the components of the one or more computing deployment solutions were successfully deployed at respective ones of the plurality of computing systems.

15. The method of claim 13, wherein identifying the context sensitive pattern data utilizes a context sensitive pattern evaluation engine of the solution deployment adoption analyzer and a context pattern database.

16. The method of claim 15, wherein the context sensitive pattern evaluation engine utilizes a predictive model built using one or more of statistical, machine learning and artificial intelligence techniques to estimate one or more parameters of the plurality of computing systems.

17. The method of claim 1, further comprising utilizing the component dependency graph to analyze impact of one or more issues associated with the given software or hardware component of the given computing deployment solution on one or more other ones of the computing deployment solutions.

18. A computer program product comprising a computer readable storage medium for storing computer readable program code which, when executed, causes a computer:
  to generate one or more computing deployment solutions utilizing a dashboard user interface, each of the one or more computing deployment solutions specifying one or more parameters for deployment of a corresponding computing solution;
  to select, from a hierarchical evaluator framework, a set of component-specific evaluators specifying checks and validation algorithms for use in component checkers for software and hardware components of the one or more computing deployment solutions;
  to modify the checks and validation algorithms for use in components checkers for software and hardware components of at least a given one of the computing deployment solutions based at least in part on an identity of a set of users responsible for adopting the given computing deployment solution at a given one of the plurality of computing systems;

to evaluate adoption of the one or more computing deployment solutions by respective ones of a plurality of computing systems utilizing one or more component evaluators connected via a network to the plurality of computing systems;

to generate one or more solution deployment adoption reports for respective ones of the one or more computing deployment solutions based on information obtained over the network from the plurality of computing systems; and to present the one or more solution deployment adoption reports via the dashboard user interface;

wherein evaluating adoption of the one or more computing deployment solutions comprises, for the given computing deployment solution comprising one or more software components and one or more hardware components:

building a component dependency graph for the one or more software components and the one or more hardware components of the given computing deployment solution;

deploying a given component checker at a given one of the one or more software components or the one or more hardware components of the given computing deployment solution;

evaluating deployment of the given software or hardware component independent of one or more other ones of the software and hardware components of the given computing deployment solution utilizing the given component checker; and utilizing the component dependency graph to analyze impact of one or more issues associated with the given software or hardware component on one or more other ones of the software and hardware components of the given computing deployment solution; and wherein the hierarchical evaluator framework comprises:

a first level with a base evaluator associated with name, owner and version properties of the given computing deployment solution;

a second level with solution type evaluators associated with different solution type properties, wherein each of the solution type evaluators in the second level inherit the name, owner and version properties associated with the base evaluator, and wherein the solution type evaluators comprise a software component evaluator associated with a software solution type property and a hardware component evaluator associated with a hardware solution type property; and at least one additional level comprising one or more component-specific evaluators that inherit the name, owner and version properties associated with the base evaluator in the first level and a solution type property associated with one of the solution type evaluators in the second level.

19. An apparatus comprising:

a processing device comprising a processor coupled to a memory;

the processing device being configured to implement a solution deployment adoption analyzer, the solution deployment adoption analyzer comprising:

a solution deployment adoption dashboard; and a set of component-specific evaluators connected to a plurality of different computing systems over a network;

wherein the solution deployment adoption dashboard is configured:

to generate one or more computing deployment solutions utilizing a dashboard user interface, each of the one or more computing deployment solutions specifying one or more parameters for deployment of a corresponding computing solution;

to select, from a hierarchical evaluator framework, the set of component-specific evaluators specifying checks and validation algorithms for use in component checkers for software and hardware components of the one or more computing deployment solutions; and to modify the checks and validation algorithms for use in components checkers for software and hardware components of at least a given one of the computing deployment solutions based at least in part on an identity of a set of users responsible for adopting the given computing deployment solution at a given one of the plurality of computing systems;

wherein the one or more component-specific evaluators are configured to evaluate adoption of the one or more computing deployment solutions by respective ones of a plurality of computing systems;

wherein the solution deployment adoption dashboard is further configured to generate one or more solution deployment adoption reports for respective ones of the one or more computing deployment solutions based on information obtained over the network from the plurality of computing systems;

wherein the solution deployment adoption dashboard is further configured to present the one or more solution deployment adoption reports via the dashboard user interface; and wherein evaluating adoption of the one or more computing deployment solutions comprises, for the given computing deployment solution comprising one or more software components and one or more hardware components:

building a component dependency graph for the one or more software components and the one or more hardware components of the given computing deployment solution;

deploying a given component checker at a given one of the one or more software components or the one or more hardware components of the given computing deployment solution;

evaluating deployment of the given software or hardware component independent of one or more other ones of the software and hardware components of the given computing deployment solution utilizing the given component checker; and utilizing the component dependency graph to analyze impact of one or more issues associated with the given software or hardware component on one or more other ones of the software and hardware components of the given computing deployment solution; and wherein the hierarchical evaluator framework comprises:

a first level with a base evaluator associated with name, owner and version properties of the given computing deployment solution;

a second level with solution type evaluators associated with different solution type properties, wherein each of the solution type evaluators in the second level inherit the name, owner and version properties associated with the base evaluator, and wherein the solution type evaluators comprise a software component evaluator associated with a software solution type property and a hardware component evaluator associated with a hardware solution type property; and at least one additional level comprising one or more component-specific evaluators that inherit the name, owner and version properties associated with the base evaluator in the first level and a solution type property associated with one of the solution type evaluators in the second level.

20. The apparatus of claim 19, wherein the one or more component evaluators are configured to verify configuration of components of the one or more computing deployment solutions based on information obtained from one or more component checkers including the given component checker that are implemented external to the solution deployment adoption analyzer at the plurality of computing systems.

\* \* \* \* \*